Patented Oct. 25, 1949

2,485,724

UNITED STATES PATENT OFFICE 2,485,724

METHOD OF MAKING LIGHTWEIGHT CELLULAR MATERIALS

Walter D. Ford, Port Allegany, Pa., assignor to Pittsburgh Corning Corporation, Allegheny County, Pa., a corporation of Pennsylvania No Drawing. Application December 21, 1945, Serial No. 636,495

10 Claims. (Cl. 18—47.5)

The present invention relates to the preparation of light weight highly cellular bodies suitable for use as thermal insulation, as floats for nets, life rafts and for numerous other purposes. The invention has particular relation to the preparation of bodies of the above indicated type from inorganic materials.

One object of the invention is to provide a highly cellular light weight body suitable for the foregoing purposes from inexpensive natural minerals.

This and other objects of the invention will be apparent from consideration of the following specification and the appended claims.

Heretofore highly cellulated bodies of light weight, high resistance to fire, moisture, vermin and other objectionable agencies and being highly suitable for use as thermal insulation and as floats, fillers for floats in life rafts, nets and numerous other applications have been prepared by heating to suitable temperature, a mixture of finely pulverized glass and carbon black. In the preparation of these products, glass of common type comprising silica, lime and soda ash was conventionally employed. It was also necessary that the glass include a substantial amount of sulfate radical adapted to react with the carbon included in the pulverulent mixture. When mixtures of this type were heated in suitable molds to temperatures somewhat above the sintering temperature, e. g. 1600° F., the particles of glass became cohered and the carbon and sulfate reacted to produce bubbles of entrapped gas that bloated and cellulated the plastic mass. The resultant bodies were of high resistance to fire, chemical action, moisture and vermin and possessed many other desirable properties. However, owing to the expense involved in the preparation of glass suitable for use in the manufacture of the product, the bloated product was relatively expensive and often could not compete with less expensive, though otherwise inferior forms of insulation.

The present invention is based upon the discovery that certain natural minerals, notably non-vitreous minerals comprising primarily $SiO_2$ and $Al_2O_3$, with or without combined oxides of alkali metals can be pulverized to form non-coherent powders and then intimately and uniformly mixed with small amounts of fine, pulverulent carbon and an oxygen containing agent such as calcium sulfate, or antimony trioxide, or arsenic trioxide, or the like and then sintered and bloated in molds by heating, to form highly cellular unitary bodies adapted for many or all of the purposes to which cellulated glass is applicable. In some instances, in order to reduce the temperature at which softening and sintering of the mineral occurs, it is desirable to add to the mixture a percentage, e. g. 10 to 20% of additional sodium oxide or sodium peroxide or even soda ash.

For purposes of the present invention numerous natural minerals comprising as their main constituents silica, aluminum oxide and alkali metal oxide, e. g. sodium or potassium oxide singly or in admixture with each other, can be employed to provide the sinterable material. The preferable minerals, however, comprise powdered non-plastic minerals such as nepheline syenite and feldspar. The composition of these minerals varies somewhat but usually the silica content will be within a range of about 55 to 77%. The aluminum oxide will be within a range of about 13 to 24%. The aluminum oxide may be in part replaced by ferric oxide (also an oxide of a trivalent metal). The alkali metal oxides (sodium or potassium) will usually fall within a range of about 8 to 17 or 18%. Typical compositions of the minerals, nepheline syenite and feldspar are as follows:

*Nepheline syenite*

|  | Per cent |
|---|---|
| $SiO_2$ | 60.22 |
| $Al_2O_3$ | 23.72 |
| $Fe_2O_3$ | 0.06 |
| $CaO$ | 0.42 |
| $Na_2O$ | 10.06 |
| $K_2O$ | 5.04 |
| Ignition loss | 0.47 |

*Feldspar*

|  | Per cent |
|---|---|
| $SiO_2$ | 64.7 |
| $Al_2O_3$ | 18.4 |
| $K_2O$ | 16.9 |

Other natural minerals that may also be employed include:

*Albany slip clay*

|  | Per cent |
|---|---|
| $SiO_2$ | 57.65 |
| $Al_2O_3$ | 15.75 |
| $Fe_2O_3$ | 4.92 |
| $CaO$ | 6.28 |
| $MgO$ | 3.20 |
| $K_2O$ | 3.10 |
| $Na_2O$ | 1.80 |
| Ignition loss | 7.30 |

Albite

| | Per cent |
|---|---|
| $SiO_2$ | 68.7 |
| $Al_2O_3$ | 19.5 |
| $Na_2O$ | 11.8 |

Spodumene

| | Per cent |
|---|---|
| $SiO_2$ | 62.91 |
| $Al_2O_3$ | 28.42 |
| $Li_2O$ | 6.77 |
| $K_2O$ | 0.68 |
| $Na_2O$ | 0.45 |
| $Fe_2O_3$ | 0.53 |
| $CaO$ | 0.11 |
| $MgO$ | 0.13 |

Slight variations of composition, of course, will occur with different samples of the minerals.

Usually $Fe_2O_3$, $MgO$, $CaO$ and $MnO$ are only minor impurities not more than 2 or 3%, the essential ingredients being oxides of silicon, aluminum and sodium or potassium.

In order to form cellular bodies from the foregoing minerals, they preferably are ground to a fine state of subdivision, e. g. until 90 or 95% will pass a mesh of 100 to 300 per inch or even finer. This may readily be accomplished in a ball mill or other suitable grinding equipment. They may also be thoroughly and uniformly admixed during or after grinding with carbon black, lamp black, ground coal or other forms of finely pulverulent carbonaceous material, in a ratio dependent somewhat on the degree of cellularity desired, e. g. 0.1 to 2% based upon the solid content of the mixture. A small amount of calcium sulfate such as dihydrate of calcium sulfate in a ratio, for example, of 0.1 to 0.5% of the total solids content of the mixture may also be added. It constitutes a gas producing agent adapted to react with carbon black to form bloating gases. Other oxygen-containing gassing agents such as sodium sulfate, magnesium sulfate, antimony trioxide or even arsenic trioxide can also be employed singly or in admixture with one another. Finely powdered calcium carbonate in a ratio of ½ to 2% can also be employed to produce gases. This produces $CO_2$ directly by decomposition at an elevated temperature. No sulfate or oxide is required with it. A mixture of .1 to 1% carbon black and .5 to 2% calcium carbonate can be employed to produce gases.

A fluxing agent such as sodium peroxide, sodium oxide, potassium oxide or an oxide forming compound such as soda ash may be included in a ratio of, for example, 5 to 25% based upon the total composition. The amount of fluxing agent required will, of course, depend upon the sintering temperature desired. Usually this will be within a range of 1500 to 1800° F.

The ingredients are all thoroughly admixed. This mixing operation can conveniently be performed upon the ball mill in which the mineral is ground. A typical batch formulation in which nepheline syenite is employed as the mineral is of the following composition:

| | Per cent |
|---|---|
| Nepheline syenite | 79.0 |
| Sodium peroxide | 19.0 |
| CaO | 1.1 |
| $CaSO_4.2H_2O$ | 0.2 |
| Lampblack | 0.7 |

It will be appreciated that nepheline syenite in the foregoing formulation can be replaced by other minerals comprising as their main constituents silica, alumina and alkali metal oxides. The feldspar previously referred to constitute examples of such minerals. Some lime, soda, silica glass, e. g. 10 to 40% of the total mixture can also be added if desired but is not essential.

The mixtures are introduced into suitable heat resistant molds, which preferably are closed to exclude air from the mixture, such as heretofore employed in the cellulation of glass are then passed slowly through a suitable furnace such as a roller hearth furnace adapted to heat the mixture to the sintering and bloating point. The powder is a poor conductor of heat so that this will extend over a period of several hours (2 or 3). The amount of mixture introduced should be approximately sufficient to completely fill the mold when the mass is at its maximum state of bloating. This, of course, depends upon the density desired in the body. Usually the molds will be ⅕ to ⅛ full before bloating of the mixture begins. The temperature probably in most cases will be within a range of 1500 to 1700° F. and preferably is about 1600° F. The temperature is sufficiently high thoroughly to cohere the individual particles of mineral into a unitary plastic mass adapted to entrap the gas bubbles as they are generated but not being sufficient to melt it down to an actual fluid state. At the temperatures given, the powdered carbon and sulfates react to form oxides of carbon, as well as sulfur compounds of gaseous nature designed to bloat and cellulate the coherent mass.

When the material is sufficiently bloated or cellulated, the molds containing the cellulated masses are withdrawn from the furnaces, cooled slightly and the cellular bodies in the form of blocks, slabs or other suitable shapes are then placed in long annealing lehrs where they are brought slowly to a temperature below the critical point. Usually the annealing operation will require 15 to 30 hours because the bodies are exceedingly frangible in texture and also are such poor conductors of heat that a long time is required sufficiently to reduce the temperature to admit of exposing of the bodies to atmospheric temperatures without danger of cracking or breaking. The blocks can be cut or trimmed to size by sawing or abrasion.

Reducing agents such as urea, sugar, dextrose or molasses can be substituted for carbon black in the foregoing formulation. These may be dissolved in water to provide a moist mass that will cohere upon drying. The soluble flux (sodium compound) may also be introduced in the same manner to provide a moist mass that can be briquetted and dried or introduced into the furnace while wet.

The resultant bodies are of very low density, for example, 10 or 20 lbs. per cubic foot and are highly resistant to fire, vermin, moisture and other agencies of like nature. The bodies are adapted to be used as insulation in buildings or other purposes where low heat transmission is desired. It can also be used as floats for nets and rafts. Many other uses naturally suggest themselves.

The forms of the invention herein described are to be regarded merely as typical or representative. It will be apparent to those skilled in the art that numerous modifications may be made therein without departure from the spirit of the invention or the scope of the appended claims.

I claim:

1. A method of forming a bloated cellular body from a natural mineral consisting essentially of silica, alumina and alkali metal oxides which comprises grinding the mineral to non-coherent pulverulent state, uniformly admixing with the powder a small amount of pulverulent carbon and an oxygen generating agent adapted to react with the carbon to form gases, increasing the temperature of the mixture while it is enclosed in a suitable mold until it sinters and coheres and the carbon and the oxygen generating agent react to produce gases whereby to bloat the sintered mass, then slowly annealing the mass to a temperature below the critical value.

2. A method of forming a bloated cellular body which comprises uniformly admixing finely ground nepheline syenite with pulverulent carbon and an oxygen generating agent, introducing said mixture into molds in an amount to fill the molds when it is bloated, then slowly increasing the temperature of the mixture until it sinters and coheres and the carbon and the oxygen generating agent react to form bubbles of entrapped gas in the mass.

3. A method of forming a bloated cellular body which comprises admixing finely ground feldspar with pulverulent carbon and an oxygen generating agent, introducing said mixture into molds in an amount to fill the molds when it is bloated, then slowly increasing the temperature of the mixture until it sinters and coheres and the carbon and the oxygen generating agent react to form bubbles of entrapped gas in the mass.

4. A method of forming a bloated cellular body which comprises admixing finely ground spodumene with pulverulent carbon and an oxygen generating agent, introducing said mixture into molds in an amount to fill the molds when it is bloated, then slowly increasing the temperature of the mixture until it sinters and the carbon and the oxygen generating agent react to form bubbles of entrapped gas in the mass.

5. A method of forming a bloated cellular body from finely pulverulized mineral containing about 60 to 77% $SiO_2$, 13 to 23% $Al_2O_3$ and 8 to 18% of an alkali metal oxide, which comprises admixing the finely ground mineral with finely pulverized carbon and an oxygen generating agent, introducing the mixture into a mold of desired configuration and size, heating the molds until the mixture sinters and the oxygen generating agent and the carbon react to form bubbles of entrapped gas.

6. A method as defined in claim 1 in which sufficient sodium flux is introduced into the mixture to provide a mass sintering within a range of about 1500 to 1800° F.

7. A process as defined in claim 1 in which the gas producing agent is calcium sulfate.

8. A method of forming a fire resistant cellular body suitable for heat insulation which comprises heating an intimate mixture of: (A) a finely ground natural mineral consisting of 60 to 77% of $SiO_2$, 13 to 23% $Al_2O_3+Fe_2O_3$ and 8 to 18% alkali metal oxide, (B) an alkali metal flux in an amount to provide a mass sinterable within a range of 1500 to 1800° F., (C) carbon black and (D) calcium sulfate to the temperature of sintering of the mixture to form a coherent bloated body, then cooling and annealing the body.

9. A method of forming a bloated cellular slab which comprises heating to sintering and bloating temperature an intimate mixture of (A) a finely pulverized natural aluminum silicate containing sufficient alkali metal oxide to render the material sinterable at a temperature within a range of about 1500 to 1800° F. (B) a small amount of pulverized carbon and oxygen containing agent designed to react therewith to produce bloating gases in a mold of suitable size and configuration to form the cohered mass, cooling the bloated material and trimming it to size.

10. A process of forming fire resistant bloated cellular slabs suitable for heat insulation which comprises heating to sintering and bloating temperature an intimate mixture of (A) a finely powdered non-coherent, non-vitreous, natural aluminum silicate (B) sufficient alkali metal compound to render it sinterable at a temperature within a range of 1500 to 1800° F. (C) powdered carbon and (D) sufficient alkaline earth metal sulfate to react with the pulverized carbon to produce bloating gases.

WALTER D. FORD.

REFERENCES CITED

The following references are of record in the file of this patent:

UNITED STATES PATENTS

| Number | Name | Date |
| --- | --- | --- |
| 235,961 | Praetorius | Dec. 28, 1880 |
| 627,443 | Ponton | June 20, 1899 |
| 1,230,085 | Ashenhurst | June 12, 1917 |
| 1,818,101 | Slidell | Aug. 11, 1931 |
| 1,898,839 | Kern | Feb. 21, 1933 |
| 2,057,349 | Rentschler | Oct. 13, 1936 |
| 2,215,078 | Cavadino | Sept. 17, 1940 |

FOREIGN PATENTS

| Number | Country | Date |
| --- | --- | --- |
| 447,805 | Great Britain | 1936 |
| 448,453 | Great Britain | June 8, 1936 |
| 539,022 | Great Britain | 1941 |